US006714569B2

United States Patent
Zhu et al.

(10) Patent No.: US 6,714,569 B2
(45) Date of Patent: Mar. 30, 2004

(54) DESIGN OF OPTICAL SUPERLATTICE TO REALIZE THIRD-HARMONIC GENERATION AND MULTI-WAVELENGTH LASER OUTPUT AND ITS APPLICATION IN THE ALL-SOLID STATE LASER

(75) Inventors: Shining Zhu, Nanjing (CN); Jingliang He, Nanjing (CN); Yongyuan Zhu, Nanjing (CN); Huitian Wang, Nanjing (CN); Guozheng Ruo, Nanjing (CN); Chao Zhang, Nanjing (CN); Yiqiang Qin, Nanjing (CN); Naiben Ming, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 10/038,518

(22) Filed: Jan. 3, 2002

(65) Prior Publication Data

US 2002/0154663 A1 Oct. 24, 2002

(30) Foreign Application Priority Data

Jan. 5, 2001 (CN) ........................................ 01108024 A

(51) Int. Cl.$^7$ .................................................. H11S 3/10
(52) U.S. Cl. ......................................... 372/22; 359/328
(58) Field of Search .............................. 372/22, 20, 75, 372/27; 359/332; 345/86

(56) References Cited

U.S. PATENT DOCUMENTS 5,185,752 A * 2/1993 Welch et al. ................. 372/22

(List continued on next page.)

FOREIGN PATENT DOCUMENTS

| CN | 94111519.4 | 6/1996 |
|----|------------|--------|
| CN | 98206498.5 | 7/1999 |
| CN | 98206499.3 | 2/2000 |

OTHER PUBLICATIONS

"Singly resonant optical parametric oscillation in periodi-
(List continued on next page.)

Primary Examiner—Quyen Leung
Assistant Examiner—Hung T Vy
(74) Attorney, Agent, or Firm—Merchant & Gould, P.C.

(57) ABSTRACT

The design of a special type of optical superlattice and its application in the all-solid state laser is involved in this invention. Nd ions doped laser crystal in common use can radiate three relatively intense spectral lines when excited: the first wavelength is around 900 nm; the second wavelength is around 1064 nm; the third wavelength is around 1300 nm, whose accurate wavelength are depended on their host crystal (for example, to Nd:YAG, they are 946 nm, 1064 nm and 1319 nm, respectively). On the other hand, for $LiNbO_3$ (LN), $LiTaO_3$ (LT), KTP and other ferroelectric crystals, the positive and negative 180° ferroelectric domains in these crystals can be arranged orderly according to certain sequence via crystal growth, electric field poling, and other state-of-the-art domain reversion technique, forming superlattice that is applicable to quasi-phase-matching (QPM) laser frequency conversion. This invention aims at the design of optical superlattice that can realize third-harmonic generation and coupled parametric process for such three emitting lines of Nd doped crystals and its application in the all-solid state laser. Such a superlattice, which can provide two or more effective reciprocal vectors, can participate in two or more QPM optical parametric processes. Different optical parametric processes in this kind of superlattice can couple each other via cascade effect. Therefore this type of superlattice can be used as an especial frequency-conversion crystal to acquire high-order harmonic generation of laser; in addition, it can realize the simultaneous output of multicolor laser or make the output of laser tunable by quasi-phase-matched frequency down-conversion. For instance, it is applicable to the frequency-conversion devices of all-solid state blue or ultraviolet laser, red-blue or green-ultraviolet dual color laser, and red-green-blue three fundamental colors laser, and can also be used as the source of entangled photon pair in the quantum telecommunication. The scheme can be extended to other active ions (such as Er, Yb, Tm, Sm etc.) doped laser crystal comprised in an all solid-state laser system.

37 Claims, 6 Drawing Sheets

U.S. PATENT DOCUMENTS

| | | | | |
|---|---|---|---|---|
| 5,436,757 A | * | 7/1995 | Okazaki et al. | 359/332 |
| 5,497,388 A | * | 3/1996 | Goto et al. | 372/22 |
| 6,021,141 A | * | 2/2000 | Nam et al. | 372/20 |
| 6,304,237 B1 | * | 10/2001 | Karakawa | 345/84 |

OTHER PUBLICATIONS cally poled lithium niobate waveguides," by Arbore et al. Feb. 1, 1997/vol. 22, No. 3/ Optics Letters, pp. 151–153.

"Interactions between Light Waves in a Nonlinear Dielectric," by Armstrong et al. Physical Review, vol. 127, No. 6, Sep. 15, 1962, pp. 1918–1939.

"Continuous–wave 532–nm–pumped singly resonant optical parametric oscillator based on periodically poled lithium niobate," by Batchko et al. Optics Letters/vol. 23, No. 3/Feb. 1, 1998, pp. 168–170.

"Continuous–wave quasi–phase–matched generation of 60 mW at 465 nm by single–pass frequency doubling of a laser diode in backswitch–poled lithium niobate," by Batchko et al. Sep. 15, 1999/vol. 24, No. 18/Optics Letters, pp. 1293–1295.

"Widely tunable all–solid–state optical parametric oscillator for the visible and near infrared," by Cui et al. Optics Letters/vol. 18, No. 2/Jan. 15, 1993, pp. 122–124.

"Quasi–Phase–Matched Second Harmonic Generation: Tuning and Tolerances," by Fejer et al. IEEE Journal of Quantum Electronics, vol. 28, No. 11, Nov. 1992, pp. 2631–2654.

"Enhancement of second–harmonic generation in $LiNbO_3$ crystals with periodic laminar ferroelectric domains," by Feng et al. Appl. Phys. Lett. 37(7) Oct. 1, 1980, pp. 607–609.

"Harmonic generations in an optical Fibonacci superlattice", by Feng et al. Physical Review B, vol. 41, No. 9, Mar. 15, 1990, pp. 5578–5582.

"Periodically poled $LiNbO_3$ for high–efficiency second–harmonic generation," by Jundt et al. Appl. Phys. Lett. 59 (21), 18 Nov. 1991, pp. 2657–2659.

"Growth of optical superlattice $LiNbO_3$ with different modulating periods and its applications in second–harmonic generation," by Lu et al. Appl. Phys. Lett. 68 (20), May 13, 1996, pp. 2781–2783.

"42%–efficient single–pass cw second–harmonic generation in periodically poled lithium niobate," by Miller et al. Optics Letters/vol. 22, No. 24/Dec. 15, 1997, pp. 1834–1836.

"Generation of ultraviolet light frequency doubling of a red laser diode in a first–order periodically poled bulk $LiTaO_3$," by Mizuuchi et al. Appl. Phys. Lett. 70 (10), Mar. 10, 1997, pp. 1201–1203.

"Quasi–phase–matched $1.034\mu m$–pumped optical parametric oscillator in bulk periodically poled $LiNbO_3$," by Myers et al. Optics Letters/vol. 20, No. 1/Jan. 1, 1995, pp. 52–54.

"Quasi–phase–matched harmonic generation through coupled parametric processes in a quasiperiodic optical superlattice," by Qin et al. Journal of Applied Physics, vol. 84, No. 12, Dec. 15, 1998, pp. 1–6.

"First–order quasi–phased matched $LiNbO_3$ waveguide periodically poled by applying an external field for efficient blue second–harmonic generation," by Yamada et al. Appl. Phys. Lett. 62 (5), Feb. 1, 1993, pp. 435436.

"Crucial effects of coupling coefficients on quasi–phase–matched harmonic generation in an optical superlattice," by Zhang et al. Optics Letters/vol. 25, No. 7/Apr. 1, 2000, pp. 436–438.

"Second–harmonic generation of blue light in bulk periodically poled LiTaO," by Zhu et al. Appl. Phys. Lett. 67 (3), Jul. 17, 1995, pp. 320–322.

"Experimental Realization of Second Harmonic Generation in a Fibonacci Optical Superlattice of $LiTaO_3$" by Zhu et al. Physical Review Letters, vol. 78, No. 14, Apr. 7, 1997, pp. 2752–2755.

"Quasi–Phase–Matched Third–Harmonic Generation in a Quasi–Periodic Optical Superlattice," by Zhu et al. SCIENCE, Oct. 31, 1997, vol. 278, pp. 843–846.

"Second harmonic generation in periodically domain–inverted $Sr_{0.6}Ba_{0.4}Nb_2O_6$ crystal plate," Zhu et al. Appl. Phys. Lett. 70 (14), Apr. 7, 1997, pp. 1793–1795.

"Third harmonic generation through coupled second–order nonlinear optical parametric processes in quasiperiodically domain–inverted $Sr_{0.6}Ba_{0.4}Nb_2O_6$ optical superlattices," by Zhu et al. Applied Physics Letters, vol. 73, No. 4, Jul. 27, 1998, pp. 432–434.

* cited by examiner (a)

(b)

(c)

DESIGN OF OPTICAL SUPERLATTICE TO REALIZE THIRD-HARMONIC GENERATION AND MULTI-WAVELENGTH LASER OUTPUT AND ITS APPLICATION IN THE ALL-SOLID STATE LASER

FIELD OF THE INVENTION

The invention generally relates to design, fabrication and application of optical superlattice with special functions in optical parametric process. The optical superlattice can be used as an efficient frequency-conversion crystal to produce short-wavelength, multi-wavelength and tunable wavelength laser in the all-solid state laser.

BACKGROUND OF THE INVENTION

With the development of modern advanced technique, lasers at various wavelength ranges are in practical need. In some wavelength ranges and at some wavelength, current semi-conductor laser or solid-state laser cannot be utilized or utilized effectively. For example, there are potential or practical needs for red, green and blue three fundamental colors all solid-state laser for laser display, blue-green laser for under-water communication, broad-band tunable laser for radar, remote sensing and environment supervising, and etc. In many application fields, mini-type (average power from tens of mini watts (mW) to several watts (W)), all solid-state laser with a couple of nonlinear crystals as frequency conversion medium can offer some wavelengths and wavelength ranges extending beyond the range that can be generated with diode laser.

An all solid-state laser usually use an efficient GaAlAs diode laser (LD) as a pump source whose emitting wavelength close 800 nm to pump a crystal doped with a laser active ion. For example, the neodymium (Nd) can cause lasing at various wavelengths in the near infrared (the accurate wavelengths are related to their host crystal), Nd doped yttrium aluminum garnet (YAG) is the most popular host. The emitting of laser crystal can be converted to other wavelength via nonlinear effect such as in a homogenous nonlinear optical crystal by birefringence-phase-matching (BPM)) or in an optical superlattice, whose nonlinear coefficient is modulated, by quasi-phase-matching (QPM).

The emitting wavelengths and other parameters of several Nd doped laser crystals are listed in Table 1.

Table 1 shows that there are three groups of emitting lines suitable for application in some ordinary Nd doped crystals: the first is around 900 nm; the second is around 1064 nm; the third is around 1300 nm. For example, The most efficient emitting line for the most commonly used Nd:YVO$_4$ crystal occurs at 914 nm, 1064 nm and 1342 nm, respectively. In addition to Nd, several other active ions like Er, Yb, Ho, and so on can be doped into various crystals to produce emitting at other wavelengths. In order to obtain shorter wavelength laser (e.g. red, green, blue and ultraviolet) or longer wavelength laser (e.g., mid-infrared), one needs to make use of nonlinear optical effect in nonlinear crystal such as KTP or an optical superlattice such as PPLN to convert above emissions into novel wavelengths. For example, by QPM frequency doubling these three lines, 1342 nm, 1064 nm and 914 nm, of Nd:YVO$_4$, using three pieces of periodic optical superlattices with different modulated periods, respectively, one can obtain red at 671 nm, green at 532 nm and blue at 457 nm, respectively. And also the emitting lines mentioned above can be used as pump sources to produce radiations at other wavelengths by optical parametric processes.

Recently, optical superlattice (alternatively named quasi-phase-matching (QPM) material) is more and more used as a frequency conversion crystal in all-solid state laser, and eventually steps into application. The theoretical basis of optical superlattice used for laser frequency conversion is QPM scheme first proposed by Bloembergen et al. in 1962. The theory can be described briefly like this: in the optical parametric process, phase mismatch between different parametric waves due to refractive index dispersion can be periodically compensated in a medium with periodically modulated nonlinear optical coefficient, which can efficiently realize the energy conversion among parametric waves. In comparison with birefringence-phase-matching, much attention has been paid to QPM because of its merits: higher efficient nonlinear coefficient, realization of phase-matching in whole transparent region of crystal, no walk-off angle, and so on. D. Feng, N. B. Ming, et al. in 1980 made use of growth striation technique to yield a single crystal of LiNbO$_3$ with periodic ferroelectric domains (PPLN, or called optical superlattice), where the nonlinear optical coefficient was modulated periodically through the ferroelectric domains. With the crystal, it was the first time for them to acquire the efficient SHG from a 1064 nm Nd:YAG laser by QPM scheme. Yamada et al. of Sony in Japan realized the periodical inversion of ferroelectric domains in z-cut LiNbO$_3$ crystal wafer with pulse electric field poling

TABLE 1 performance parameters of several Nd doped laser materials

| laser crystal | wavelength of radiation (nm) | puming wavelength (nm) | absorption bandwidth (nm) | fluorescence lifetime ($\mu$s) | emitting section ($\times 10^{-19}$ cm$^2$) |
|---|---|---|---|---|---|
| Nd:YAG | 946 | 808 | 4 | 230 | 2.4 |
|  | 1064 |  |  |  |  |
|  | 1319 |  |  |  |  |
| Nd:YVO$_4$ | 1064 | 808 | 21 | 98 | 25 |
|  | 1342 |  |  |  |  |
| Nd:SVAP | 1065 | 809 | 1.6 | 215 | 5.0 |
| Nd:YLF | 1047 | 797 | 6.4 | 500 | 1.8 |
|  | 1053 | 806 | 4.0 |  | 1.2 |
| Nd:YAP | 1079 | 800 | ~5 | 170 | 2.0 |
|  | 1341 |  |  |  |  |
| Nd:glass | 1053 | 801 | 14 | 350 | 4.2 |
| Nd:GSGG | 1061 | 808 | 3 | 118 | 1.3 |
| NYAB | 1062 | 808 | 3.6 | 60 | 2.0 | technique firstly at room temperature, and then acquired efficient blue by QPM SHG in 1993. Yamada et al. used metal electrodes and multi-pulse technique. Whereafter Byer et al. used liquid electrodes; S. N. Zhu et al. and Rosenman et al. used single-pulse technique realizing periodic arrangement of ferroelectric domains in $LiNbO_3$, $LiTaO_3$, and $KTiOPO_4$, and acquiring efficient SHG of blue within these crystals, respectively. Up to date, this kind of superlattice materials have been applied extensively in various kinds of optical parametric processes, such as SHG, sum-frequency generation (SFG), optical parametric oscillation and amplification (OPO/OPA), and so on, where laser can be converted from some fixed frequency into a novel frequency or a couple of novel frequencies or can be tunable in some frequency range, which meets the demands for different wavelength in various application fields.

Y. Y. Zhu, N. B. Ming et al. firstly introduced Fibonacci structure into optical superlattice in 1990. S. N. Zhu, Y. Y. Zhu and N. B. Ming published *"Quasi-Phase-Matched Third-Harmonic Generation in a Quasi-Periodic Optical Superlattice"* on SCIENCE in 1997. In this work, they firstly proposed the thought of directly acquiring third-harmonic generation (THG) through the simultaneous realization of QPM in SHG and sum-frequency generation processes in a single superlattice, which has been verified experimentally. They adopted $LiTaO_3$ superlattice with Fibonacci domain sequence as nonlinear crystal, acquiring green light at 523 nm which is a third harmonic of fundamental light at 1570 nm. The work verified QPM multi-parametric processes can be simultaneously realized, and be coupled mutually by cascade effect to produce novel wavelength. However, Fibonacci sequence can only realize such a process with the fundamental light at that given wavelength above, it doesn't fit any other wavelength, in particular those available wavelengths, such as the corresponding wavelength emitting from those doped laser crystals or semi-conductor lasers introduced above.

SUMMARY OF THE INVENTION

A laser system in accordance with the principles of the present invention includes an active ion doped laser crystal. A pumping source is in communication with the laser crystal so as to pump the laser crystal. A resonant cavity with an output mirror is in communication with the laser crystal so as to resonate light from the laser crystal.

A frequency conversion crystal, disposed within a heater, is located along the optical path of the laser, either inside or outside of the resonant cavity. The frequency conversion crystal is an optical superlattice of quasi-phase-matching material, and is adapted to simultaneously perform two or more parametric processes for frequency conversion of light from the laser.

This invention aims at the design of optical superlattice based on three groups of available emitting lines (900 nm, 1064 nm and 1300 nm) of $Nd^{3+}$ doped crystals to realize short-wavelength lasers (like blue and ultraviolet), multi-color lasers (like red-blue, green-ultraviolet and red-green-blue) or the output of tunable lasers by QPM third-harmonic generation or other coupled optical parametric processes. These optical superlattices may be designed with different structures (including periodic, quasi-periodic, dual-periodic, aperiodic and etc.) that dependent on QPM conditions and expectant efficiency. Therefore, the optical superlattice can serve as nonlinear optical crystal to construct a LD(Laser Diode) pumped all-solid state laser to generate lasers in some particular wavelengths in visible, infrared and ultraviolet or to generate tunable laser in some wavelength range.

BRIEF DESCRIPTION OF THE DRAWINGS

The present invention will be further described by way of non-limitative example with reference to the accompanying drawings, in which.

DETAILED DESCRIPTION OF THE INVENTION

The principle of the design can be clearly described in the wave vector space or the reciprocal space. QPM is regarded as wave vector conservation or quasi-momentum conservation condition in a nonlinear optical process. Taking SHG as an example, QPM can be expressed as $\Delta k - G = 0$, where $\Delta k = k_s - 2k_f$ is the wave vector mismatch of SHG, $$k_s = \frac{2\pi n_{2w}}{\lambda/2} \quad \text{and} \quad k_f = \frac{2\pi n_w}{\lambda}$$

are second-harmonic and fundamental wave vector, respectively. Herein, $n_{2w}$ and $n_w$ are fundamental and second-harmonic refractive index. G is the grating wave vector of modulated structure in the superlattice, also called reciprocal vector. For periodic structure, reciprocal vector $G = 2m\pi/\Lambda$, $\Lambda$ is period and m equal to integer that presents the order of QPM. When m=1, the QPM condition of SHG in periodic structure can be expressed as $$k_s - 2k_f - \frac{2\pi}{\Lambda} = 0. \tag{1}$$

Generally speaking, periodic structure can only achieve a single QPM optical parametric process, such as SHG, sum or different-frequency generation etc. Efficient high-order harmonic generation and other coupled parametric process require two or more parametric processes to satisfy the QPM conditions simultaneously. Take third-harmonic generation as an example, two parametric processes, SHG and sum-frequency generation, are needed to realize third-harmonic generation. Firstly the frequency of fundamental is doubled generating second harmonic, then second harmonic is mixed with remnant fundamental, generating third harmonic. Traditionally the two steps are finished within two serial nonlinear crystals or two serial periodic superlattices, respectively. In fact, these two processes can be simultaneously realized in a single optical superlattice on the basis of QPM. A quasi-periodic, dual-periodic, or aperiodic, and even a periodic optical superlattice at some especial wavelength, can bear this function, only qualification is that this superlattice can simultaneously provide two reciprocal vectors to satisfy the QPM conditions for SHG and sum-frequency generation (shown in FIG. 1). The QPM for third harmonic generation is $$k_s - 2k_f - G_1 = 0, \text{ (for SHG)} \quad (2)$$

$$k_t - k_s - k_f - G_2 = 0. \text{ (for sum-frequency generation)} \quad (3)$$

wherein $G_1$ and $G_2$ are two predesigned reciprocal vectors of this superlattice, respectively.

$$k_t = \frac{2\pi n_{3w}}{\lambda/3}$$

is the wave vector of third harmonic. $n_{3w}$ is the refractive index of third harmonic.

Figure 1:
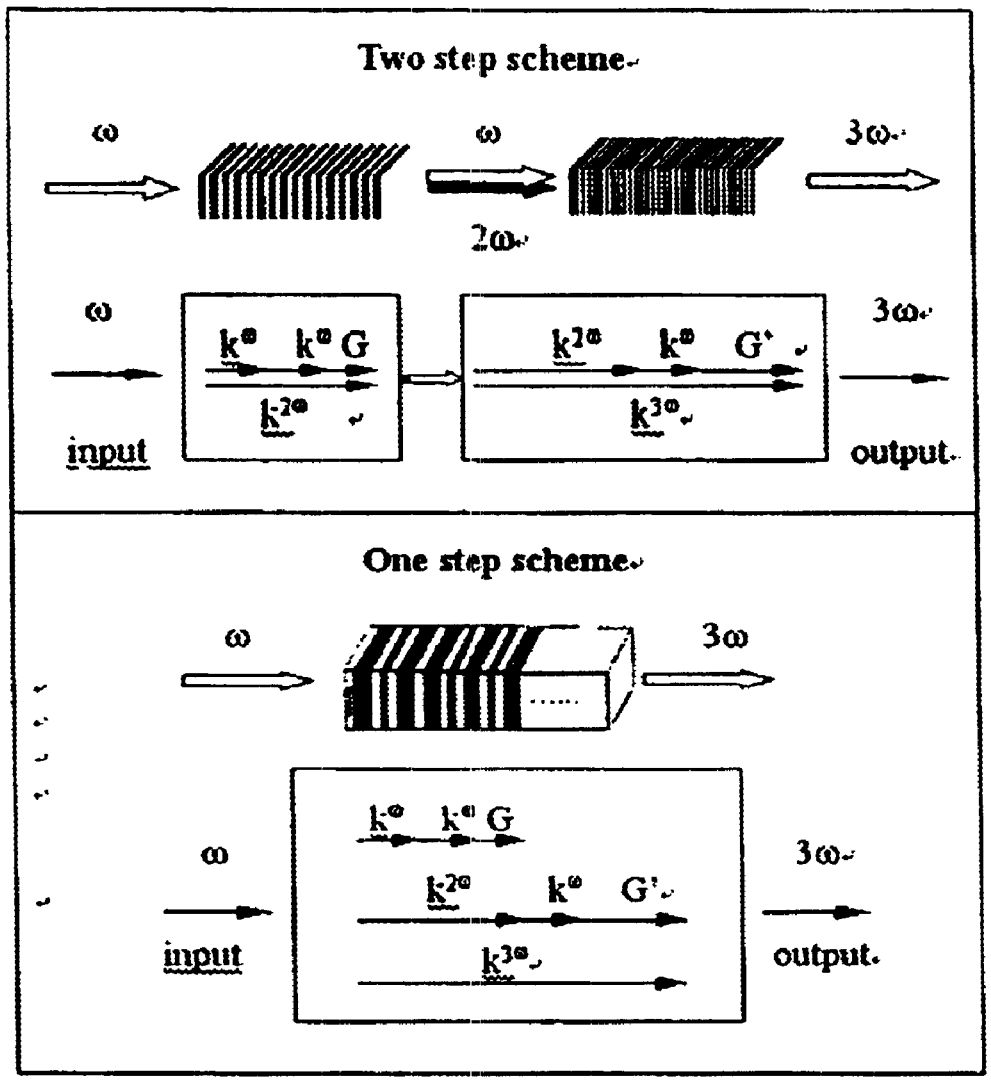
FIG. 1 is a schematic diagram showing two methods to realize third-harmonic-generation of a laser.

FIG. 1 shows two methods to realize third-harmonic-generation of laser. With reference to FIG. 1, the first picture is two step scheme, that is, by means of two periodic optical superlattice aligned in series, the fundamental frequency within the first superlattice is doubled whose reciprocal vector G is used to compensate for wave vector mismatching of SHG, and the second superlattice is used for the sum frequency mixing of second-harmonic and residual fundamental, whose reciprocal vector G' is used to the phase match of sum-frequency generation; the next picture is one step scheme, that is, third harmonic can be realized within only a single optical superlattice whose two predesigned reciprocal vectors G and G' satisfy the QPM conditions of SHG and sum-frequency generation, respectively. It allows third harmonic to generate by the cascade of these two processes in a single crystal. Therefore, under the equivalent condition one-step scheme holds higher conversion efficiency than two-step scheme.

Figure 2:
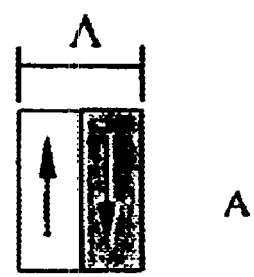
FIG. 2 is a schematic diagram showing the periodic structure of the superlattice.
Figure 2:
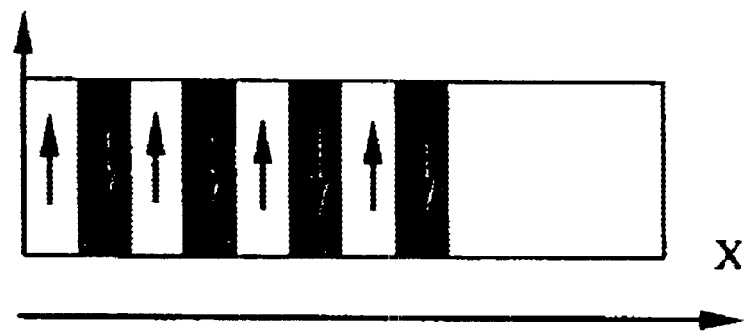
Figure 2:

The following is several optical superlattices involved in this invention and their structure design:

1. Periodic structure: FIG. 2 is the schematic diagram of periodic optical superlattice. In FIG. 2, (a) is a basic structure unit A composed of a pair of positive and negative ferroelectric domains whose width A is the period constant of the superlattice (here the arrows denote these positive and negative domains, and also denote the positive and negative sign of quadratic nonlinear efficient); (b) is a schematic diagram of periodic superlattice; and (c) is the optical micrograph showing a $LiNbO_3$ optical superlattice revealed by etching, wherein the black and white areas represent positive and negative domains, respectively. For periodic structure, reciprocal vector $G_m = 2m\pi/\Lambda$, when m=1, the highest efficient nonlinear coefficient is acquired.

Figure 3:
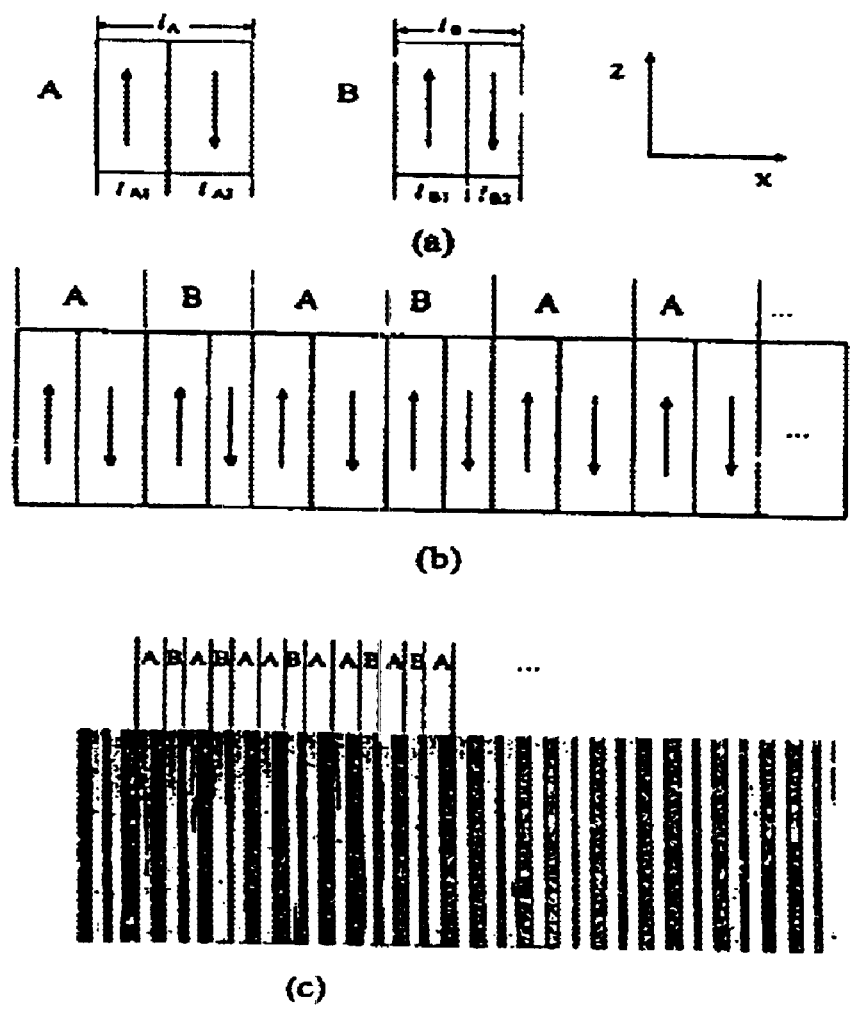
FIG. 3 is a schematic diagram showing the quasi periodic optical superlattice.

2. Generalized quasi-periodic structure: FIG. 3 is the schematic diagram of a generalized two-component quasi-periodic structure. As shown in FIG. 3, (a) shows two basic structure units A and B composed by a pair of positive and negative ferroelectric domains (shown by arrows) whose width are $l_A$ and $l_B$, respectively; (b) shows that A and B are aligned according to certain quasi-periodic sequence to form quasi-periodic structure; (c) is an optical micrograph showing a $LiNbO_3$ optical superlattice revealed by etching, the black and white areas represent positive and negative domains, respectively.

According to FIG. 3, The two basic structure units, A and B, are composed of a pair of positive and negative domains, respectively. The sequence can be obtained through projection method. That is, choose a line with the slope of tan θ passing through a point on a two-dimensional square lattice, the width of the projection area is sinθ+cosθ. The projected points of the lattice inside the area make up of a two-component quasi-periodic sequence (shown in FIG. 4). The projection angle θ can choose any real number. Generalized quasi-periodic structure doesn't exist a simple iterative rule, but can be directly acquired through projection method. The normal formula about the sequence can be expressed as:

$$a_n = \begin{cases} A, \text{ if } f(n) \leq 1/\tau \\ B, \text{ if } f(n) > 1/\tau \end{cases} \quad (4)$$

where $$f(n) = C_0 + \frac{n}{\tau} - \left[C_0 + \frac{n}{\tau}\right],$$

[x] represents the greatest integer less than x. τ is the tangent of the projection angle θ and $C_0$ is a constant only determined by the phase of the peak in the Fourier spectrum of the structure.

When $\tau = \frac{\sqrt{5}+1}{2}$ and $C_0 = \left(\frac{\sqrt{5}-1}{2}\right)^3$, the final generated sequence is a standard Fibonacci sequence.

The reciprocal vector of the general QPOS can be written as follows:

$$G_{m,n} = \frac{2\pi(m+n\tau)}{D} \quad (5)$$

$$g_{m,n} = 2(1+\tau)\frac{1}{D}\text{sinc}\left(\frac{G_{m,n}l}{2}\right)\text{sinc}\left(\frac{\pi(1+\tau)(ml_A - nl_B)}{D}\right), \quad (6)$$

where parameter $D = \tau l_A + l_B$, τ=tan θ, θ is the projection angle, $l_A$ and $l_B$ are the width of structure units A and B, and $l = l_{A1} = l_{B1}$ is the width of positive domain in A and B (FIG. 3).

Figure 4:
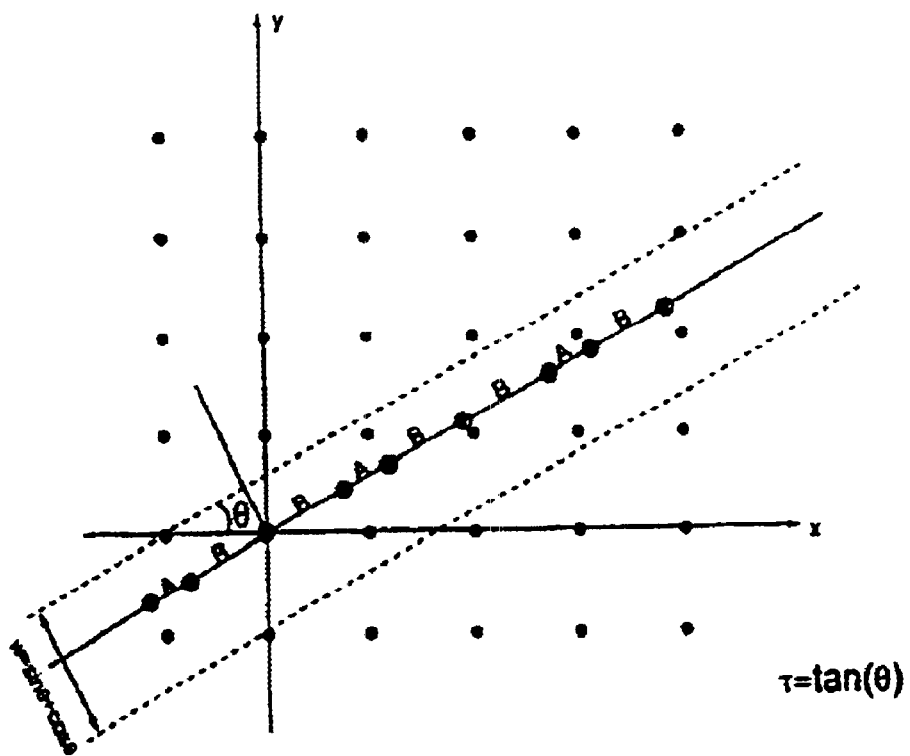
FIG. 4 is a schematic diagram showing the generation of one-dimension two-component quasi-periodic sequence based on projection method.

FIG. 4 is a schematic diagram of one-dimensional two-component quasi-periodic sequence, as shown in FIG. 3, based on projection method. Accordingly, a three-component quasi-periodic structure, which can provide three reciprocal vectors for the simultaneous realization of three corresponding QPM processes, can be acquired by projecting a three-dimension cubic lattice on a one-dimension line.

Figure 5:
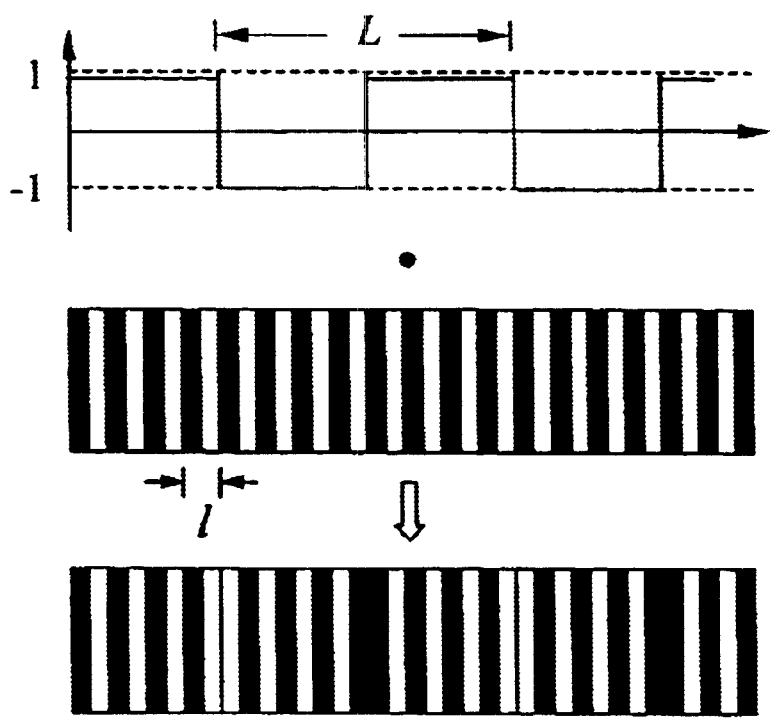
FIG. 5 is the schematic diagram showing a dual-periodic structure.

3. Dual-periodic structure: FIG. 5 is the schematic diagram of dual-periodic structure. As seen from FIG. 5, this structure is composed of a bigger and smaller modulated period whose width is L and l, respectively. The reciprocal vector of the structure is:

$$G_{m,n} = mG_1 + nG_L \quad (7)$$

where $G_1 = 2\pi/l$ and $G_L = 2\pi/L$ are the reciprocal vectors of the two periodic structures.

In the three structures above, periods Λ, L and l, integers m and n, structure parameter $l_A$ and $l_B$, and the tangent τ of the projection angle θ are determined by the required QPM conditions. For example, one can work out reciprocal vectors $G_1$ and $G_2$ for third harmonic generation based on Eq. (2,3).

4. Aperiodic structure: an aperiodic structure can be defined by an aperiodic function. The function used for single parameter process is:

$$H(x) = f_\Lambda\left(\frac{floor\left(\frac{x}{d}\right) + ceil\left(\frac{x}{d}\right)}{2} \cdot d\right)$$

where $$f_\Lambda(x) = 1 - 2 \cdot floor\left(\frac{2 \cdot x}{\Lambda}\right) + 4 \cdot floor\left(\frac{x}{\Lambda}\right)$$

Herein, floor(y) equals the largest integer not greater than y, and ceil(y) equals the smallest integer not less than y. $\Lambda$ is two times of the coherent length corresponding to the parametric process. d is the smallest domain width, which can be set at random, however, too small domain should be avoided for the consideration of technique. The width of all the domains in the aperiodic structure is integer times of d. The domain is positive when this function equals +1, and negative when this function equals −1.

For coupled parameter process, such as third-harmonic generation, the corresponding aperiodic function is more complex, which is $$H_3(x) = H_2(x) + \left(floor\left(floor\left(\frac{x}{d}\right) \cdot \gamma\right) - floor\left(ceil\left(\frac{x}{d}\right) \cdot \gamma\right)\right) \cdot (H_2(x) - H_1(x))$$

where $$H_1(x) = f_{\Lambda_1}\left(\frac{floor\left(\frac{x}{d_1}\right) + ceil\left(\frac{x}{d_1}\right)}{2} \cdot d_1\right),$$

the aperiodic function corresponding to the second-harmonic generation process $$H_2(x) = f_{\Lambda_2}\left(\frac{floor\left(\frac{x}{d_2}\right) + ceil\left(\frac{x}{d_2}\right)}{2} \cdot d_2\right),$$

the aperiodic function corresponding to the sum frequency generation process.

Herein, $\gamma$ (0<$\gamma$<1) is a structure parameter. The optical superlattice used in coupled parameter process can be optimized through the adjust of d and $\gamma$.

EXAMPLE

1. The periodic optical superlattice of $LiTaO_3$ used to realize frequency doubling to red light (671 nm) and frequency tripling to blue light (447 nm) by mean of 1342 nm output of solid-state $Nd:YVO_4$ laser as fundamental.

Figure 6:
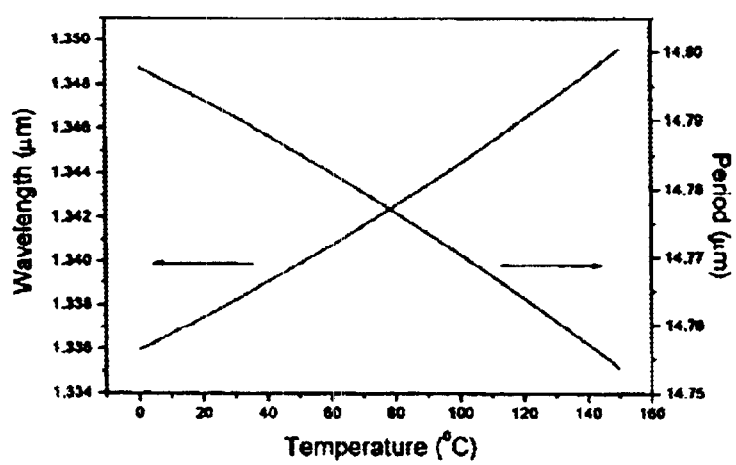
FIG. 6 is a graph showing the relationship of matching wavelength and corresponding period vs. temperature.

According to the dispersive characteristics, periodic superlattice of $LiTaO_3$ can simultaneously satisfy the phase-matching conditions (equation 2 and 3) at around the fundamental wavelength of 1342 nm. The corresponding period is 17.78 $\mu$m, and phase-matching temperature is about 80° C., shown in FIG. 6. This superlattice can be used to obtain efficient output of red of 671 nm and blue of 447 nm by intra- or extra-cavity frequency doubling and tripling of the 1342 nm emission line corresponding to the transition of $^4F_{3/2} \rightarrow ^4I_{13/2}$ of laser crystal $Nd:YVO_4$.

2. The quasi-periodic optical superlattice of $LiNbO_3$ used to realize frequency doubling to red of 671 nm and frequency tripling to blue of 447 nm of 1342 nm output of $Nd:YVO_4$ laser.

Also for the fundamental source of 1342 nm, according to the $LiNbO_3$ characteristics, a generalized quasi-periodic structure can be used. The reciprocals and structure parameters of the superlattice can be designed by mean of the equation (2) and (3):

$$G_{m,n} = G_1 = \Delta k_1 = 4\pi T(n_{2\omega} - n_\omega)/\lambda$$

$$G_{m',n'} = G_2 = \Delta k_2 = 2\pi(3n_{3\omega} - 2n_{2\omega} - n_\omega)/\lambda$$

where $\lambda$ is fundamental wavelength, $n_\omega$, $n_{2\omega}$, $n_{3\omega}$ are refractive indices of fundamental, second-harmonic and third-harmonic wavelength. Two reciprocal vectors are used to compensate the phase mismatches of frequency doubling and sum-frequency generation. Following equations related to the parameters of quasi-periodic structure:

$$2\pi \frac{m + n\tau}{D} = G_{m,n} = \Delta k_1$$

$$2\pi \frac{m' + n'\tau}{D} = G_{m',n'} = \Delta k_2$$

$$\tau = \frac{m'\Delta k_1 - m\Delta k_2}{n\Delta k_2 - n'\Delta k_1}$$

$$D = 2\pi \frac{mn' - m'n}{n'\Delta k_1 - n\Delta k_2}$$

$$D = \tau l_A + l_B$$

We can obtain m=1, n=1, m'=3, n'=4, $\tau$=0.161, D=14.886, $l_A$=14.800 $\mu$m, $l_B$=12.507 $\mu$m from equations above, and the corresponding phase matching temperature is 150° C.

3. The dual-periodic optical superlattice of $LiTaO_3$ used to realize frequency doubling and frequency tripling a 1064 nm $Nd:YVO_4$, Nd:YAG laser to obtain green at 532 nm and ultraviolet at 355 nm.

According to the dispersive characteristics of $LiTaO_3$ crystal, the structure parameters of dual-periodic optical superlattice of $LiTaO_3$ can be obtained from equation 2, 3 and 7:

$$G_{m,n} = mG_l + nG_L = \Delta k_1 = \frac{4\pi}{\lambda}(n_{2\omega} - n_\omega)$$

$$G_{m',n'} = m'G_l - n'G_L = \Delta k_2 = \frac{2\pi}{\lambda}(3n_{3\omega} - 2n_{2\omega} - n_\omega)$$

where $G_l=2\pi/l$, $G_L=2\pi/L$, two periods of the dual-periodic structure l=6.76 $\mu$m, L=50.83 $\mu$m, the ranks of the reciprocal vectors m=1, n=−1, m'=3, n'=1, and corresponding phase-matching temperature is around 100° C.

4. The quasi-periodic optical superlattice of $LiNbO_3$ pumped by a green of 532 nm, generating red at 630 nm and blue at 440 nm through QPM parametric and sum-frequency generation, respectively.

Generating red and blue pumped by green needs to couple two parametric processes of frequency down-conversion and sum-frequency generation. The corresponding quasi-phase matching condition is:

$$k_p - k_s - k_i - G_{m_1,n_1} = 0 \quad \text{(for frequency down-conversion)} \quad (8)$$

$$k_{blue} - k_p - k_i - G_{m_2,n_2} = 0 \quad \text{(for sum frequency generation)}, \quad (9)$$

where $$k_p = \frac{2\pi n_p}{\lambda_p}, k_s = \frac{2\pi n_s}{\lambda_s}, k_i = \frac{2\pi n_i}{\lambda_i}, k_{blue} = \frac{2\pi n_b}{\lambda_b}$$

are wave vectors of pump, signal, idler, sum frequency of pump and idler, respectively. Using the related wavelengths and corresponding refractive indices in the process, the same steps as example 2 are taken. We obtain the actual parameters of this quasi-periodic structure: m=1, n=1, m'=3, n'=4, $\tau=0.564$, $D=18.20$, $l_A=14.351$ μm, $l_B=10.10$ μm, the corresponding phase-matching temperature is 150° C.

Figure 7A:
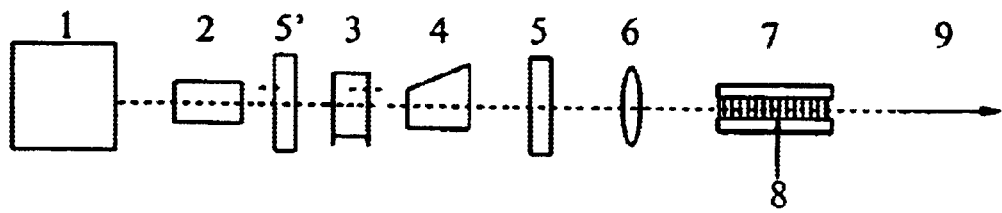
FIGS. 7(a) and 7(b) are schematic diagrams showing two examples of a quasi-continuous red-blue dual-wavelength laser.
Figure 7B:
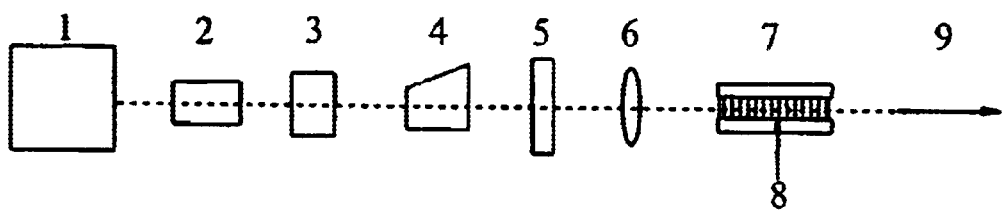
Figure 8:
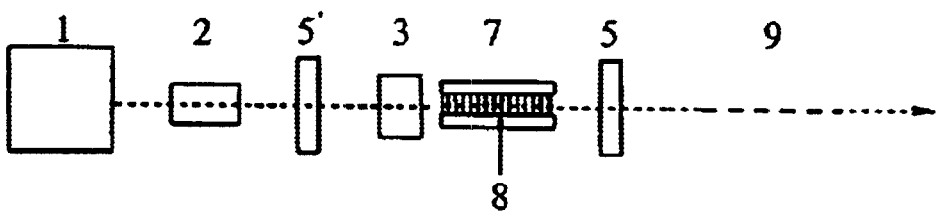
FIG. 8 is a schematic diagram showing another example of a multiple wavelength laser according to the invention.

1. All-solid-state multi-wavelength laser:

(1). Quasi-continuous red (671 nm)-blue (447 nm) dual wavelength laser:

The laser crystal Nd:YVO$_4$ is pumped by a 807–809 nm laser diode, generating continuous infrared output at 1342 nm. An acoustic-optical or electro-optical Q-switch change the continuous output into a quasi-continuous one with high peak power, which is directly extracavity frequency doubled and tripled in the said superlattice to realize an efficient red and a blue output. FIGS. 7(a), 7(b) and FIG. 8 are the schematic diagrams of three examples of the laser according to one embodiment of the invention.

FIGS. 7(a) and 7(b) show two structures of a quasi-continuous red-blue dual-wavelength laser (this process has been demonstrated experimentally). In the figures, the same reference numbers identify correspondingly. Therefore, the descriptions thereof will be omitted. Reference number 1 designates a laser diode (LD) used as a pump source (e.g., model OPC-DO15-809, the output wavelength thereof is 809 nm, the highest output power is 15W). Reference number 2 represents the collimating lens. Reference number 3 is a Nd:YVO$_4$ crystal with coated front face that constitutes a resonant cavity of a 1.342 μm laser together with an output mirror 5, i.e., cavity mirror. The 1.342 μm continuous laser is changed into quasi-continuous laser by an acousto-optical or electro-optical switch 4, a quasi-continuous output with high peak power (~kW) and with repetition frequency of hundreds of Hz to several kilo Hz and duration (~nanosecond) can be obtained behind the cavity mirror 5. Reference numbers 6 and 7 represent a focusing lens and a heater, respectively. The optical superlattice 8 is used as the frequency conversion crystal. Reference number 9 represents the beam path for the laser. In FIG. 7(a), there is an cavity mirror 5' that is an input mirror of the resonant cavity. Conventionally, the input mirror 5' may be replaced with the coated front end face of the laser crystal 3 (as shown in FIG. 7(b)).

In addition, FIG. 8 shows another example of the laser according to the first embodiment of the present invention. From FIG. 8, it can be seen that the heater 7 including the superlattice is inserted within the resonant cavity comprising input mirror 5', laser crystal 3 and output mirror 5. It is appreciated by those skilled in the art that the input mirror 5' can also be omitted.

In these examples, different laser crystals such as Nd:YAG, Nd:YAP can also be used besides Nd:YVO$_4$. The difference is that the outputs of red and blue are of different wavelengths, and the structure of frequency conversion crystal must be adjusted to match the actual fundamental wavelength.

The laser system using an optical superlattice as a frequency conversion crystal according to this embodiment employs extracavity frequency conversion and quasi-continuous output. The laser diode 1 pumps the laser crystal 3 disposed in the resonant cavity. The pump wavelength corresponds to the absorption wavelength of the active ions in the laser crystal. For the laser crystals doped with Nd ion such as Nd:YAG, Nd:YAP, Nd:YVO$_4$, and so on, the wavelength of pump should be around 810 nm; for those doped with Er, the wavelength of pump should be around 980 nm. One of the emission lines of lasers above can be amplified resulting from the design of the resonant cavity. The acousto-optical or electro-optical switch 4 disposed in the cavity is to turn the continuous output to quasi-continuous one to acquire high peak power. The end-faces of the resonant cavity, the laser crystal 3 and the acousto-optic or electro-optic switch 4 may be coated to control the transmission ratio of different wavelength. The front face of cavity is of high transmission at the pump wavelength, high reflectivity at certain emission wavelength (the resonant wavelength) of the laser crystal. The front face of the laser crystal 3 is of high transmission at the pump wavelength. The two end-faces of the laser crystal 3 and the A-O or E-O switch 4 are of high transmission at the resonant wavelength. The reflectivity of the output mirror 5 of the resonant cavity at the resonant wavelength region is 90%~96%. The output of this laser system, as fundamental wave, can be modified and focused by a lens system, such as focusing lens 6, into the superlattice 8 to realize frequency conversion. In this process, two quasi-phase matching conditions are satisfied simultaneously. In the embodiment, the front face of the superlattice 8 is of high transmission at the fundamental wavelength, and the back face thereof is of high transmission at the generated wavelengths. The superlattice 8 is disposed in the heater 7. The output lasers from the superlattice 8 are divided by an optical system (not shown).

As shown in FIG. 7(b), the front face of the laser crystal 3 can serve for the input mirror of resonant cavity. This input mirror should be of high transmission at the pump wavelength, high reflectivity at the resonant wavelength. According to the needs, the resonant wavelength of the resonant cavity can be designed to be one of the emission wavelengths of said laser crystal. For example, for the Nd doped crystal, said resonant wavelength can be set at about 1300 nm (small difference exists between different host crystals, such as 1342 nm for Nd:YVO$_4$), or about 1064 nm (1064 nm for Nd:YVO$_4$), or about 900 nm (914 nm for Nd:YVO$_4$); for those doped with Er, the wavelength can be set at about 1500 nm, and so on.

In the laser system of this embodiment, the superlattice 8 may possess the ability to compensate the phase mismatches of two optical parametric processes, respectively, corresponding to the fundamental wavelength. The structure of the superlattice 8 may be of periodic, quasi-periodic, dual-periodic or other structure sequence.

As shown in FIGS. 7(a), 7(b) and 8, the superlattice 8 is disposed in the heater 7. The heater 7 is used to 1) control the operating point to phase-matching temperature; 2) eradicate photorefractive effect (the working temperature may be 100–200° C. for the crystals, such as LiNbO$_3$ and LiTaO$_3$ crystals.)

The optical superlattice to realize second harmonic generation and third harmonic generation of a fundamental of around 1300 nm can be designed to acquire red of around 650 nm and blue of around 440 nm. The optical superlattice to realize second harmonic generation and third harmonic generation of a fundamental of around 1064 nm can be designed to acquire green of 532 nm and ultra-violet of 355 nm. Further, the optical superlattice to realize second harmonic generation and third harmonic generation of the fundamental of around 900 nm can be designed to acquire blue of 450 nm and ultra-violet of 300 nm.

According to another embodiment, the laser system may also employs intracavity frequency conversion and continuous output as shown in FIG. 8. The structure of the laser system of this embodiment is substantially the same as that of the first embodiment. The difference there between is in that the optical superlattice 8 of this embodiment is disposed in the cavity. All the optical faces of the resonant cavity, the laser crystal 3 and the superlattice 8 need to be coated with films to control the transmission ratio of different wavelength. As mentioned above, the front face of the cavity is of high transmission at the pump wavelength, high reflectivity at the emission wavelength (the resonant wavelength). The front face of the laser crystal 3 is of high transmission at the pump wavelength. The two ends of the laser crystal 3, the optical superlattices 8 are all of high transmission at the resonant wavelength. The reflectivity ratio of the output mirror 5 of the resonant cavity at the resonant wavelength is 90%~96%. In this system, the optical superlattice 8 is used to realize frequency conversion, wherein two quasi-phase matching conditions are satisfied simultaneously. The optical superlattice 8 should be disposed in a heater (similar to heater 7). The output lasers from said superlattice 8 are modified and divided by an optical system (not shown).

Similar to the first embodiment, in the present embodiment, the pump wavelength of the laser diode 2 should correspond to the absorption wavelength of the optical active ion in the laser crystal. For the laser crystals doped with Nd such as Nd:YAG, Nd:YAP, Nd:YVO$_4$, and so on, the wavelength of laser diode 2 should be around 810 nm; for the materials doped with Er, the wavelength of pump source LD should be around 980 nm.

The front face of the laser crystal 3 can be used for the input mirror of resonant cavity. The input mirror should be of high transmission at the pump light, high reflectivity at the resonant wavelength. According to the needs, the resonant wavelength of the resonant cavity can be designed based on one of emission lines of the said laser crystal. For example, for the laser crystal doped with Nd, the resonant wavelength can be set at about 1300 nm (small difference exists between different host crystals, such as 1342 nm for Nd:YVO$_4$), or about 1064 nm (1064 nm for Nd:YVO$_4$), or about 900 nm (914 nm for Nd:YVO$_4$); for materials doped with Er, the wavelength can be set at about 1500 nm, and so on.

As mentioned in the first embodiment, the superlattice 8 in the present embodiment is also disposed in a heater. The usages of the heater are the same as those mentioned in the first embodiment.

The laser system of the present embodiment can also realize the technical effect as those described in the first embodiment. The nonlinear crystal for the frequency conversion can be two serial optical superlattices with periodic structure, quasi-periodic structure or other aperiodic structure, respectively. The fundamental wavelength of 1064 nm passes the first periodic superlattice, and green light of 532 nm by frequency doubling is generated. In the second superlattice, the green light of 532 nm generates red of about 630 nm as signal and infrared of about 3400 nm as idler through the quasi-phase matching parametric process. The sum frequency of the idler and green light of 532 nm generates blue light of around 440 nm through another quasi-phase matching process. The signal and idler can be resonated in the optical resonant cavity (double resonant operation). The system will generate three-color lasers of red, green, blue, whose wavelengths are around 630 nm, 532 nm, 440 nm, respectively.

In the laser system of the present embodiment, the crystal for the frequency conversion can also be a set of serial optical superlattices of periodic structure, quasi-periodic structure or other aperiodic structure. The fundamental wavelength of 1064 nm passes the first periodic superlattice to generate green light at 532 nm by frequency doubling. In the second superlattice, the green light of 532 nm generates red light of about 630 nm as signal and infrared light of about 3400 nm as idler through the quasi-phase matching parametric process. The sum-frequency of the said idler and the said pump light at 532 nm generates blue light at about 440 nm through another quasi-phase matching process in the same superlattice. The signal or idler resonates in the optical resonant cavity (single resonant operation). The system will generate three-color lasers of red, green, blue, whose wavelengths are about 630 nm, 532 nm, 440 nm, respectively.

Alternatively, the crystal for the frequency conversion can be an optical superlattice of quasi-periodic or other aperiodic structure. This structure can provide three reciprocal vectors, which respectively take part in the following three quasi-phase matching processes: generating 532 nm green light by frequency doubling a 1064 nm fundamental wavelength; generating red light of around 630 nm and idler of around 3400 nm by a optical parametric using 532 nm green light as a pump; and generating blue light of about 440 nm by mixing said idler and said pump. This optical resonant cavity can generate three-color lasers of red, green, blue, whose wavelengths are around 630 nm, 532 nm, 440 nm, respectively, by the means of single resonant operation or double resonant operation.

In addition, the optical superlattice crystals in the first embodiment and the present one can be those nonlinear optical crystals whose nonlinear coefficients can be modulated by the modulation of microstructure structures, for example, ferroelectric domain structure. These crystals include: LiNbO$_3$, LiTaO$_3$, KTiOPO$_4$ (KTP), and so on (including the congruent, stoichiometric, or all kinds of doped and ion replaced crystals, such as Mg: LiNbO$_3$ etc.). The laser crystals involved in this invention may include: Nd:YAG, Nd:YVO$_4$, Nd:SVAP, Nd:YLF, Nd:YAP, Nd:glass, Nd:GSGG, Nd:YAB and all kinds of laser crystals doped with Nd, Er and other active ions.

(2) Quasi-continuous green (532 nm)-ultraviolet (355 nm) dual-wavelength laser:

The fundamental scheme is the same as example (1). The fundamental wavelength is 1064 nm, the schematic diagram is shown in FIG. 7. The superlattice structure can be selected based on the above description in this text.

The design of a special type of optical superlattice according to the present invention can be applied in the all-solid state laser. Active ions like Nd doped laser crystal in common use can radiate three relatively intense spectral lines when excited: the first wavelength is around 900 nm; the second wavelength is around 1064 nm; the third wavelength is around 1300 nm, whose accurate wavelength are depended on their host crystal (for example, to Nd:YAG, they are 946 nm, 1064 nm and 1319 nm, respectively). On the other hand, for LiNbO$_3$ (LN), LiTaO$_3$ (LT), KTP and other ferroelectric crystals, the positive and negative 180° ferroelectric domains in these crystals can be arranged orderly according to certain sequence via crystal growth, electric field poling, and other state-of-the-art domain reversion technique, forming superlattice that is applicable to quasi-phase-matching (QPM) laser frequency conversion. This invention aims at the design of optical superlattice that can realize third-harmonic generation and coupled parametric process for such three emitting lines of active ion (e.g., Nd) doped crystals and its application in the all-solid state laser. Such a superlattice, which can provide two or more effective reciprocal vectors, can participate in two or more QPM optical parametric processes. Different optical parametric processes in this kind of superlattice can couple each other via cascade effect. Therefore this type of superlattice can be used as a special frequency-conversion crystal to acquire high-order harmonic generation of laser; in addition, it can realize the simultaneous output of multicolor laser or make the output of laser tunable. For instance, it is applicable to the frequency-conversion devices of all-solid state blue or ultraviolet laser, red-blue or green-ultraviolet dual color laser, and red-green-blue three fundamental colors laser, and can also be used as the source of entangled photon pair in the quantum telecommunication. The scheme can be extended to other active ions (such as Er, Yb, Tm, Sm etc.) doped laser crystal comprised in an all solid-state laser system.

Although the invention has been described with reference to specific embodiments, this description is not meant to be construed in a limiting sense, various modifications of the disclosed embodiments, as well as alternative embodiments, will be apparent to persons skilled in the art. It is, therefore, contemplated that the appended claims will cover all modifications that fall within the true scope of the invention.

What is claimed:

1. A laser system, comprising:
    an active ion doped laser crystal;
    a pumping source in communication with said laser crystal so as to pump said laser crystal;
    a resonant cavity comprising an output mirror, said resonant cavity being in communication with said laser crystal so as to resonate light from said laser crystal;
    a frequency conversion crystal disposed within a heater, the heater being arranged in an optical path of said laser outside said resonant cavity;
    wherein said frequency conversion crystal is an optical superlattice comprising quasi-phase-matching material, and enables performance of two or more parametric processes for frequency conversion of light from said laser.

2. The laser system of claim 1, wherein a pumping wavelength corresponds to an absorption wavelength of active ions in said laser crystal.

3. The laser system of claim 1, wherein said laser crystal is doped with at least one selected from the group consisting of Nd, Er, Yb, Tm, and Sm active ions.

4. The laser system of claim 1, wherein said optical superlattice is a nonlinear optical crystal, wherein nonlinear coefficients of said superlattice can be modulated by a modulation of microstructure structures.

5. The laser system of claims 1, wherein said optical superlattice comprises at least one selected from the group consisting of $LiNbO_3$, $LiTaO_3$, $KTiOPO_4$(KTP), and Mg:$LiNbO_3$.

6. The laser system of claim 1, wherein a front face of said superlattice is of high transmission at a fundamental wavelength, and a back face of said superlattice is of high transmission at generated wavelength.

7. The laser system of claim 1, wherein a structure of said superlattice is one selected from the group consisting of periodic, quasi-periodic, and dual-periodic.

8. The laser system of claim 1, wherein end-faces of said laser crystal are coated to control a transmission ratio of different wavelengths.

9. The laser system of claim 1, wherein a front face of the said laser crystal forms an input mirror of said resonant cavity, having high transmission at the pump wavelength, and high reflectivity at a resonant wavelength of the laser crystal, and wherein a back face of said laser crystal has high transmission at said resonant wavelength, and wherein a reflectivity of said output mirror at said resonant wavelength region is 90%~96%.

10. The laser system of claim 1, wherein said resonant cavity further comprises an input mirror.

11. The laser system of claim 10, wherein said input minor has high transmission at a pump wavelength, and high reflectivity at a resonant wavelength of said laser crystal, and wherein two end-faces of the laser crystal have high transmission at the resonant wavelength, and wherein a reflectivity of said output mirror at said resonant wavelength region is 90%~96%.

12. A laser system of claim 10 further comprising an acousto-optical or electro-optical switch disposed between said laser crystal and said output mirror, for tuning an output to acquire high peak power.

13. A laser system of claim 12, wherein said end faces of said acousto-optical or electro-optical switch have high transmission at said resonant wavelength.

14. The laser system of claim 1, further comprising a lens system for modifying and focusing an output of said cavity into said superlattice to realize frequency conversion.

15. The laser system of claim 1, wherein said optical superlattice uses second harmonic generation and third harmonic generations of a fundamental wavelength of approximately 1300 nm to produce red light of approximately 650 nm and blue light of approximately 440 nm.

16. The laser system of claim 1, wherein said optical superlattice uses second harmonic generation and third harmonic generations of a fundamental wavelength of approximately 1064 nm to produce green light of approximately 532 nm and ultra-violet light of approximately 355 nm.

17. The laser system of claim 1, wherein said optical superlattice uses second harmonic generation and third harmonic generations of a fundamental wavelength of approximately 900 nm to produce blue light of approximately 450 nm and ultra-violet light of approximately 300 nm.

18. The laser system of claim 1, wherein said laser crystal is doped with at least one selected from the group consisting of Nd:YAG, Nd:YVO4, Nd:SVAP, Nd:YLF, Nd:YAP, Nd:glass, Nd:GSGG, and Nd:YAB.

19. A laser system, comprising:
    an active ion doped laser crystal;
    a pumping source in communication with said laser crystal so as to pump said laser crystal;
    a resonant cavity comprising an output mirror, said resonant cavity being in communication with said laser crystal so as to resonate light from said laser crystal;
    a frequency conversion crystal disposed within a heater, the beater being arranged in an optical path of said laser inside said resonant cavity;
    wherein said frequency conversion crystal is an optical superlattice comprising quasi-phase-matching material, and enables performance of two or more parametric processes for frequency conversion of light from said laser.

20. The laser system of claim 19, wherein a pumping wavelength corresponds to an absorption wavelength of active ions in said laser crystal.

21. The laser system of claim 19, wherein said laser crystal is doped with at least one selected from the group consisting of Nd, Er, Yb, Tm, and Sm active ions.

22. The laser system of claim 19, wherein said optical superlattice is a nonlinear optical crystal, wherein nonlinear coefficients of said superlattice can be modulated by a modulation of microstructure structures.

23. The laser system of claims 19, wherein said optical superlattice comprises at least one selected from the group consisting of $LiNbO_3$, $LiTaO_3$, $KTiOPO_4$(KTP), and Mg:$LiNbO_3$.

24. The laser system of claim 19, wherein a front face of said superlattice is of high transmission at a fundamental wavelength, and a back face of said superlattice is of high transmission at generated wavelengths.

25. The laser system of claim 19, wherein a structure of said superlattice is one selected from the group consisting of periodic, quasi-periodic, and dual-periodic.

26. The laser system of claim 19, wherein end-faces of said laser crystal are coated to control a transmission ratio of different wavelengths.

27. The laser system of claim 19, wherein a front face of the said laser crystal forms an input mirror of said resonant cavity, having high transmission at the pump wavelength, and high reflectivity at a resonant wavelength of the laser crystal, and wherein a back face of said laser crystal has high transmission at said resonant wavelength, and wherein a reflectivity of said output mirror at said resonant wavelength region is 90%~96%.

28. The laser system of claim 19, wherein said resonant cavity further comprises an input mirror.

29. The laser system of claim 28, wherein said input mirror has high transmission at a pump wavelength, and high reflectivity at a resonant wavelength of said laser crystal, and wherein two end-faces of the laser crystal have high transmission at the resonant wavelength, and wherein a reflectivity of said output mirror at said resonant wavelength region is 90%~96%.

30. The laser system of claim 19, further comprising a lens system for modifying and focusing an output of said cavity into said superlattice to realize frequency conversion.

31. The laser system of claim 19, wherein said optical superlattice uses second harmonic generation and third harmonic generations of a fundamental wavelength of approximately 1300 nm to produce red light of approximately 650 nm and blue light of approximately 440 nm.

32. The laser system of claim 19, wherein said optical superlattice uses second harmonic generation and third harmonic generations of a fundamental wavelength of approximately 1064 nm to produce green light of approximately 532 nm and ultra-violet light of approximately 355 nm.

33. The laser system of claim 19, wherein said optical superlattice uses second harmonic generation and third harmonic generations of a fundamental wavelength of approximately 900 nm to produce blue light of approximately 450 nm and ultra-violet light of approximately 300 nm.

34. The laser system of claim 19, wherein said frequency conversion crystal comprises two serial optical superlattices with one selected from the group consisting of periodic structure, quasi-periodic structure and aperiodic structure;

the first superlattice uses a fundamental wavelength of approximately 1064 nm to generate green light of approximately 532 nm by frequency doubling;

the second superlattice uses said green light of approximately 532 nm to generate red light of approximately 630 nm as a signal and infrared light of approximately 3400 nm as an idler through a quasi-phase matching parametric process, and a sum frequency of said idler and said green light of approximately 532 nm generates blue light of approximately 440 nm through another quasi-phase matching process, wherein said signal and said idler can be resonated in said optical resonant cavity;

such that said system generates three-color lasers of red, green, and blue, with wavelengths of approximately 630 nm, 532 nm, 440 nm, respectively.

35. The laser system of claim 19, wherein said frequency conversion crystal comprises a set of serial optical superlattices with one selected from the group consisting of periodic structure, quasi-periodic structure and aperiodic structure;

a first superlattice of said set uses a fundamental wavelength of approximately 1064 nm to generate a green light of approximately 532 nm by frequency doubling;

a second superlattice of said set uses said green light of approximately 532 nm to generate red light of approximately 630 nm as a signal and infrared light of approximately 3400 nm as an idler through a quasi-phase matching parametric process, and a sum-frequency of said idler and said green light of approximately 532 nm generates blue light at approximately 440 nm through another quasi-phase matching process in said second superlattice, wherein said signal or said idler can be resonated in said resonant cavity;

such that said system generates three-color lasers of red, green, and blue, with wavelengths of approximately 630 nm, 532 nm, 440 nm, respectively.

36. The laser system of claim 19, wherein said frequency conversion crystal comprises an optical superlattice of quasi-periodic or aperiodic structure, wherein said structure is adapted to provide three reciprocal vectors, which respectively take part in three quasi-phase matching processes as follows:

generating green light of approximately 532 nm by frequency doubling a fundamental wavelength of approximately 1064 nm;

generating red light of approximately 630 nm and an idler of approximately 3400 nm by an optical parametric using said green light of approximately 532 nm as a pump; and generating blue light of approximately 440 nm by mixing said idler and said pump;

such that said resonant cavity generates three-color lasers of red, green, and blue, with wavelengths of approximately 630 nm, 532 nm, 440 nm, respectively, by single resonant operation or double resonant operation.

37. The laser system of claim 19, wherein said laser crystal is doped with at least one selected from the group consisting of Nd:YAG, Nd:YVO4, Nd:SVAP, Nd:YLF, Nd:YAP, Nd:glass, Nd:GSGG, and Nd:YAB.

* * * * *